(12) United States Patent
Currier et al.

(10) Patent No.: US 12,141,895 B2
(45) Date of Patent: Nov. 12, 2024

(54) SYSTEM AND METHOD FOR COMMUNICATING TRACTION DEVICE SLIPPAGE

(71) Applicant: Caterpillar Inc., Peoria, IL (US)

(72) Inventors: Shaun David Currier, Naperville, IL (US); Aaron Robert Shatters, Montgomery, IL (US); Eric W. Cler, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/823,110

(22) Filed: Aug. 30, 2022

(65) Prior Publication Data

US 2024/0070934 A1    Feb. 29, 2024

(51) Int. Cl.
| | |
|---|---|
| *E02F 9/26* | (2006.01) |
| *G05D 1/00* | (2006.01) |
| *G06T 11/00* | (2006.01) |
| *G07C 5/00* | (2006.01) |
| *E02F 9/02* | (2006.01) |

(52) U.S. Cl.
CPC .............. *G06T 11/001* (2013.01); *E02F 9/26* (2013.01); *G05D 1/0038* (2013.01); *G07C 5/008* (2013.01); *E02F 9/02* (2013.01)

(58) Field of Classification Search
CPC . G06T 11/001; E02F 9/26; E02F 9/02; G05D 1/0038; G07C 5/008
USPC .......................................................... 345/592
See application file for complete search history.

(56) References Cited

U.S. PATENT DOCUMENTS

| | | | |
|---|---|---|---|
| 8,914,215 B2 | 12/2014 | Faivre et al. | |
| 10,631,460 B2 | 4/2020 | Wieckhorst et al. | |
| 10,669,697 B2 | 6/2020 | Miller et al. | |
| 2012/0153671 A1 | 6/2012 | Wetterich et al. | |
| 2013/0325266 A1* | 12/2013 | Padilla | E02F 3/842 701/1 |
| 2014/0156162 A1* | 6/2014 | Faivre | B60K 35/00 701/84 |
| 2014/0324272 A1* | 10/2014 | Madsen | G05D 1/0246 701/28 |
| 2015/0352956 A1* | 12/2015 | Miuchi | B62D 15/0295 701/41 |
| 2016/0379389 A1* | 12/2016 | Fukada | G09G 5/003 345/589 |

(Continued)

FOREIGN PATENT DOCUMENTS

| | | | | |
|---|---|---|---|---|
| CN | 106840706 A | | 6/2017 | |
| JP | H0991597 A | | 4/1997 | |
| WO | WO2015/091693 | * | 6/2015 | ............. G06T 13/20 |

*Primary Examiner* — Jin Ge (57) ABSTRACT

A system for communicating slippage experienced by at least one traction device of a work machine, to a remote operator interface for controlling the work machine through the remote operator interface is described. The system includes a controller configured to receive data associated with a speed of the at least one traction device of the work machine and determine a slippage condition of the at least one traction device based on the data. The controller is further configured to activate a visual overlay over a virtual image, of the at least one traction device, displayed in a video feed to represent the slippage condition on the remote operator interface. The video feed is a real-time video feed, indicating one or more operations of the work machine, displayed on the remote operator interface.

20 Claims, 6 Drawing Sheets

(56) References Cited

U.S. PATENT DOCUMENTS

| | | | |
|---|---|---|---|
| 2017/0101103 A1* | 4/2017 | Foster | A01B 63/11 |
| 2017/0278425 A1* | 9/2017 | Kozumi | E02F 9/26 |
| 2019/0301143 A1* | 10/2019 | Miller | B60K 37/06 |
| 2022/0072954 A1* | 3/2022 | Prabhakar | B60K 35/00 |
| 2022/0078961 A1* | 3/2022 | Kraus | G06T 7/70 |
| 2022/0089127 A1* | 3/2022 | Hanaoka | G06Q 30/0645 |
| 2022/0319250 A1* | 10/2022 | Kakutani | G06T 11/203 |
| 2023/0339402 A1* | 10/2023 | Graham | H04N 7/181 |

* cited by examiner

SYSTEM AND METHOD FOR COMMUNICATING TRACTION DEVICE SLIPPAGE

TECHNICAL FIELD

The present disclosure relates to traction device slippages in work machines. More particularly, the present disclosure relates to communicating a slippage experienced by one or more traction devices of a work machine to a remote operator interface for controlling the work machine through the remote operator interface.

BACKGROUND

Work machines, such as wheel loaders, generally include one or more material-engaging implements to load and move materials, such as soil, rock, sand, debris, etc., from one location to another location at a worksite. In order to load such materials, work machines are often required to interact with (e.g., cultivate, dig, rip, or otherwise disturb) a material bank so that material can be sourced from the material bank. As an example scenario, as a work machine attempts to dig and scoop in material from the material bank, a reactionary resistance applied by the material bank on the implement of the work machine may impede the work machine's ingress into the material bank, and may cause one or more traction devices, such as wheels, of the machine to slip over an underlying ground surface. Excessive slippage can lead to premature traction device wear.

An operator physically stationed within an operator cabin of the work machine may readily perceive and feel traction device slippage and can appropriately take action to mitigate traction device slippage. However, an operator stationed and operating the work machine remotely may suffer from inadequate machine feedback and/or a dulled perception of traction device slippage, resulting in either a delayed response or a no response to resolve traction device slippage. If traction device slippage is left unaddressed or unresolved, it can result in premature wear and reduced life of the traction devices leading to unscheduled repair or replacement of the traction devices and unplanned machine downtime.

U.S. Pat. No. 10,669,697 relates to a machine having a ground-engaging work tool and including a traction device configured to move the machine on a ground surface, a control system configured to determine a slip experienced by the machine as the machine moves on the ground surface, and a display device. The display device pictorially display (a) the determined slip, and (b) one or more target ranges of slip, wherein the machine efficiency when slip has a value within a target range may be higher compared to the efficiency when slip is outside the target range.

SUMMARY

In one aspect of the present disclosure, a system for communicating slippage experienced by at least one traction device of a work machine, to a remote operator interface for controlling the work machine through the remote operator interface is described. The system includes a controller configured to receive data associated with a speed of the at least one traction device of the work machine and determine a slippage condition of the at least one traction device based on the data. The controller is further configured to activate a visual overlay over a virtual image, of the at least one traction device, displayed in a video feed to represent the slippage condition on the remote operator interface. The video feed is a real-time video feed, indicating one or more operations of the work machine, displayed on the remote operator interface.

In another aspect of the present disclosure, a method for communicating slippage experienced by at least one traction device of a work machine, to a remote operator interface for controlling the work machine through the remote operator interface. The method includes receiving, by a controller, data associated with a speed of the at least one traction device of the work machine and determining, by the controller, a slippage condition of the at least one traction device based on the data. The method further includes activating, by the controller, a visual overlay over a virtual image, of the at least one traction device, displayed in a video feed to represent the slippage condition on the remote operator interface. The video feed is a real-time video feed, indicating one or more operations of the work machine, displayed on the remote operator interface.

In yet another aspect of the present disclosure, a work machine is described. The work machine includes at least one traction device and a system for communicating slippage experienced by the at least one traction device, to a remote operator interface for controlling the work machine through the remote operator interface. The system includes a controller configured to receive data associated with a speed of the at least one traction device of the work machine and determine a slippage condition of the at least one traction device based on the data. The controller is further configured to activate a visual overlay over a virtual image, of the at least one traction device, displayed in a video feed to represent the slippage condition on the remote operator interface. The video feed is a real-time video feed, indicating one or more operations of the work machine, displayed on the remote operator interface.

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
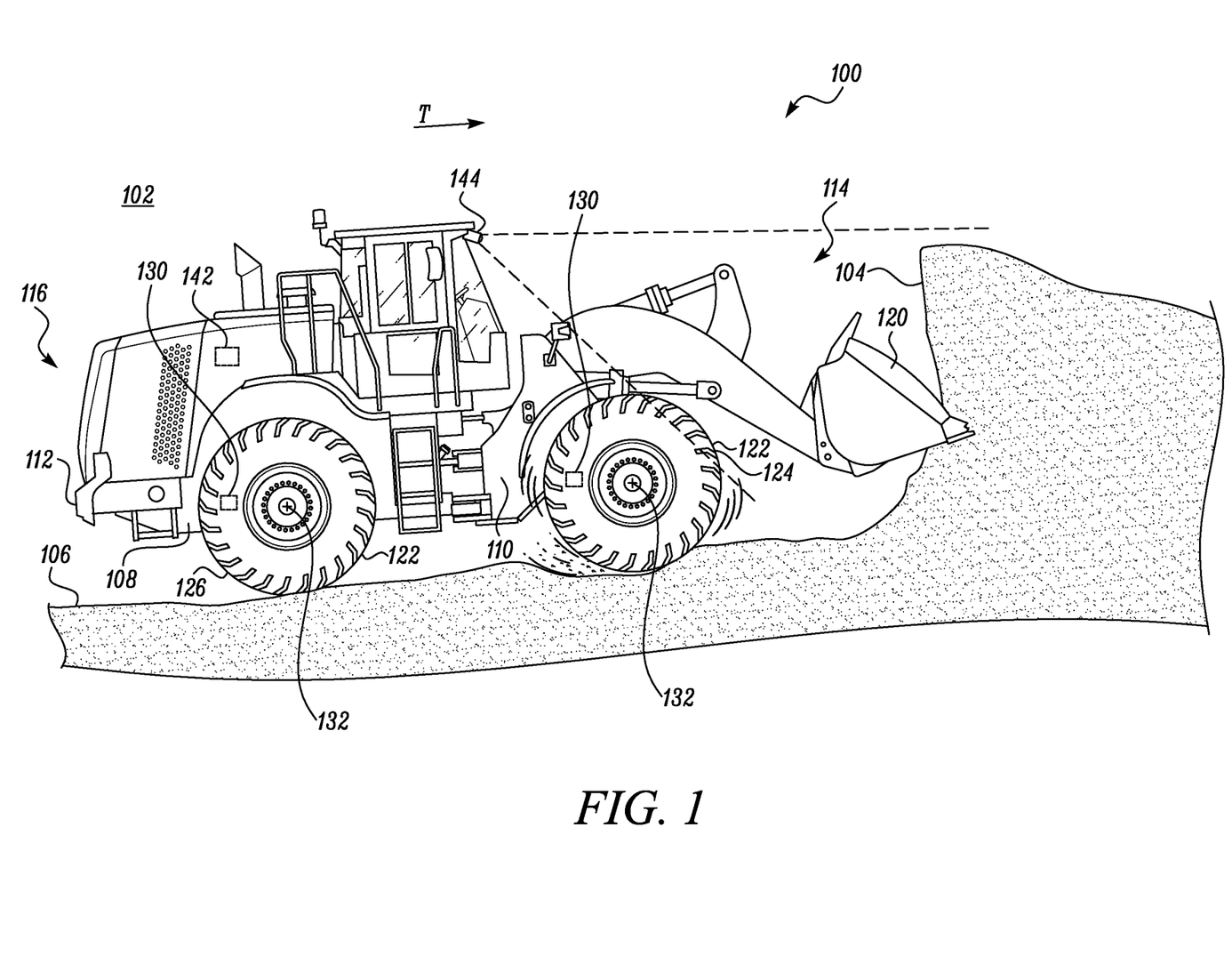
FIG. 1 is a view of an exemplary work machine operating at a worksite, in accordance with an embodiment of the present disclosure.

Referring to FIG. 1, an exemplary work machine 100 operating at a worksite 102 is illustrated. The worksite 102 may include a mine site, a landfill, a quarry, a construction site, or any other type of worksite. The worksite 102 may also have one or more material banks (e.g., see material bank 104). The material bank 104 may include or correspond to a pile or a heap of one or more materials, which may be raised with respect to a surface of the worksite 102 on which the work machine 100 can move. The material bank 104 may include a variety of materials. For example, the material bank 104 may include one or more of gravel, sand, dirt, disintegrated particles, and the like. In other examples, the material bank 104 may be an embankment or hill formed of a material, such as clay or rocks.

The work machine 100 may be embodied as a construction machine and may include a wheel loader. The work machine 100 may be configured to traverse the worksite 102 and/or interact with (e.g., cultivate, dig, rip, or otherwise disturb) the material bank 104 at the worksite 102. Although the reference to a wheel loader is shown, the work machine 100 may include other mobile machines that perform operations, such as mining, construction, farming, etc., at any suitable worksite. For example, the work machine 100 may include, but is not limited to, a track-type tractor, a hydraulic excavator or a shovel, a motor grader, and other similar earth-moving machines, and aspects of the present disclosure may be applied to such machines. The work machine 100 may be an unmanned machine having various levels of autonomy, and may include a semi-autonomous machine or a remotely operated machine, that receives commands related to its motion and function from a remote operator workstation 150 (shown in FIG. 2).

The work machine 100 includes a frame 108 having a forward frame portion 110 and a rearward frame portion 112. The forward frame portion 110 may define a forward end 114 of the work machine 100, while the rearward frame portion 112 may define a rearward end 116 of the work machine 100. The terms 'forward' and 'rearward', as used herein, are in relation to an exemplary direction of travel of the work machine 100, as represented by arrow, T, in FIG. 1, with said direction of travel being exemplarily defined from the rearward end 116 towards the forward end 114. Such an exemplary direction of travel T, as noted, may be reversed by the work machine 100, as and when required.

The work machine 100 may include an implement 120, such as a bucket, pivotably and/or operably connected to the frame 108. The implement 120 may be capable of performing various operations, such as ripping, digging, and/or scooping material from the material bank 104 at the worksite 102. The work machine 100 may also include one or more traction devices 122 supported by the frame 108, that engages a ground surface 106 to move the work machine 100 in the direction of travel, T. The traction device 122 may include crawler tracks, wheels, or a combination of the two. In the exemplary embodiment shown in FIG. 1, the traction device 122 includes wheels such as, front wheels 124 supported by the forward frame portion 110 and rear wheels 126 supported by the rearward frame portion 112 of the work machine 100.

The work machine 100 may further include one or more speed sensors 130 configured to determine data associated with speed of operation of the at least one traction device 122 of the work machine 100. In an embodiment, separate speed sensors 130 may be associated with one or both of the front wheels 124 and/or one or both of the rear wheels 126 to determine the data associated with the speed of the operation of the corresponding wheels 124, 126. In some embodiment, a single speed sensor 130 may be associated with an axle shaft 132 of the work machine 100 to determine the data associated with the speed of operation of the front wheels 124 and the rear wheels 126 of the work machine 100.

In some embodiments, the work machine 100 may include an inertial measurement unit (IMU) sensor 142 to provide data associated with an acceleration of the work machine 100. The IMU sensor 142 may provide signals indicative of the data associated with the acceleration of the work machine 100 along the direction of travel 'T' of the work machine 100. In this regard, the IMU sensor 142 may include an accelerometer.

The work machine 100 may also include a visual imaging system such as a camera 144 for generating a real time video feed indicating one of more operations of the work machine 100 at the worksite 102. The video feed may be transmitted wirelessly to the remote operator workstation 150 (shown in FIG. 2) from the work machine 100 such that the video feed can be viewed by a remote operator at the remote operator workstation 150. The camera 144 may be positioned on the work machine 100 or at the worksite 102 to capture different views of the work machine 100 and/or the worksite 102. For example, as shown in FIG. 1, the camera 144 may be positioned on the frame 108 or an outer surface of the work machine 100 to capture a field of view that includes at least a portion of the traction devices 122. In some embodiments, the field of view may also capture the implement 120 and a portion of the worksite 102 at which the work machine 100 is operating. As an example, the camera 144 may be mounted atop an operator cab of the work machine 100.

The remote operator workstation 150 (shown in FIG. 2) is operable as an interface by the remote operator for controlling the work machine 100. As shown in FIG. 3, the remote operator workstation 150 is configured to receive the real-time video feed 146 indicating one or more operations of the work machine 100 from the camera 144 and display the video feed 146 on a remote operator interface 152 of the remote operator workstation 150. The remote operator may utilize one or more input devices of the remote operator workstation 150 for providing commands related to the motion and other operations of the work machine 100. For example, the input device may include one or more of the remote operator interface 152, steering wheels, levers, pedals, joysticks, and/or buttons. The remote operator workstation 150 may be locally situated at the worksite 102 or may alternatively be remotely located. The remote operator workstation 150 may be configured to communicate with the work machine 100 wirelessly, for example, by use of radio or other electromagnetic digital or analog transmission.

Figure 2:
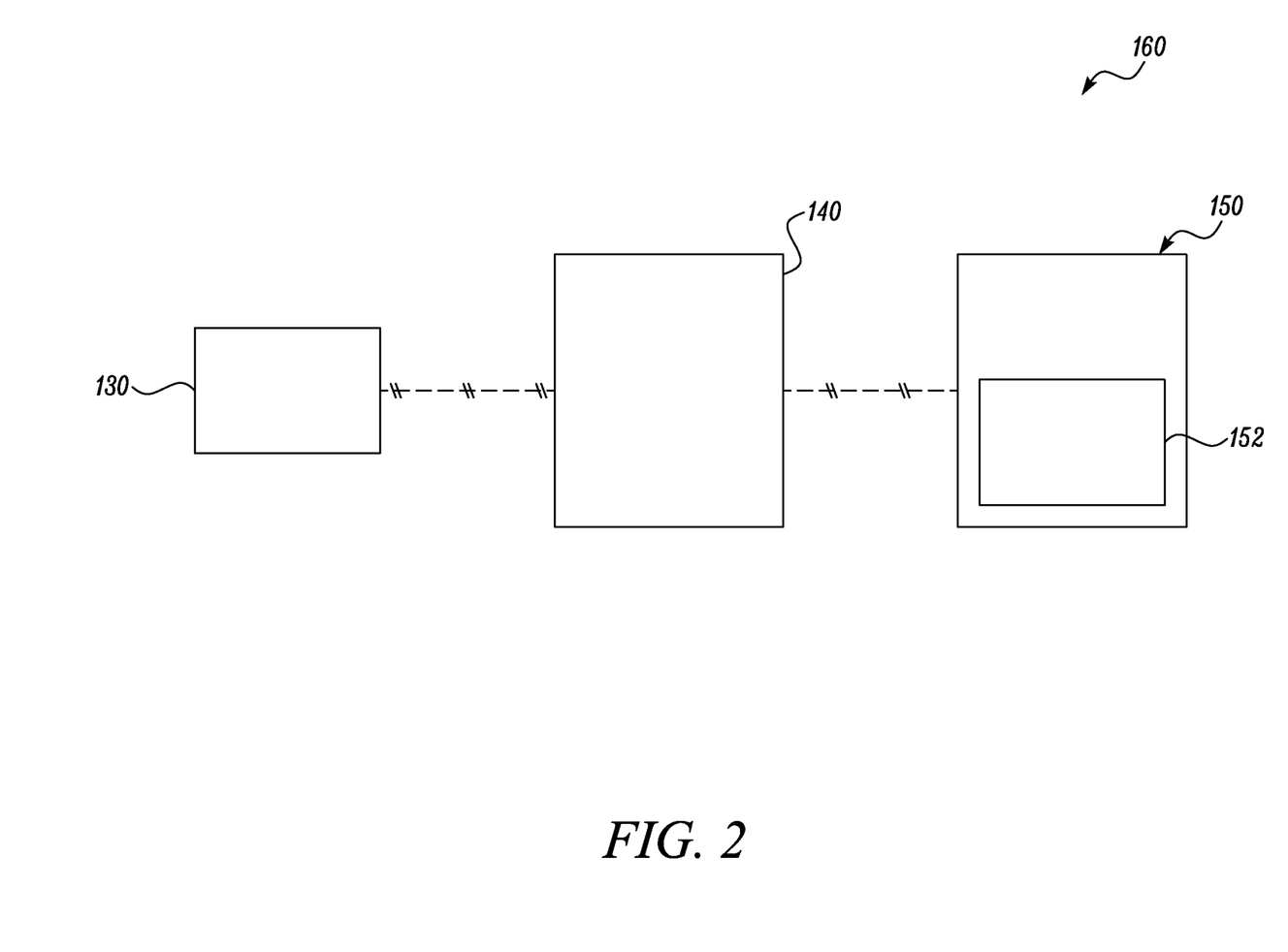
FIG. 2 is a schematic of a system for communicating a slippage condition of the work machine to a remote operator interface, in accordance with an embodiment of the present disclosure.
Figure 3:
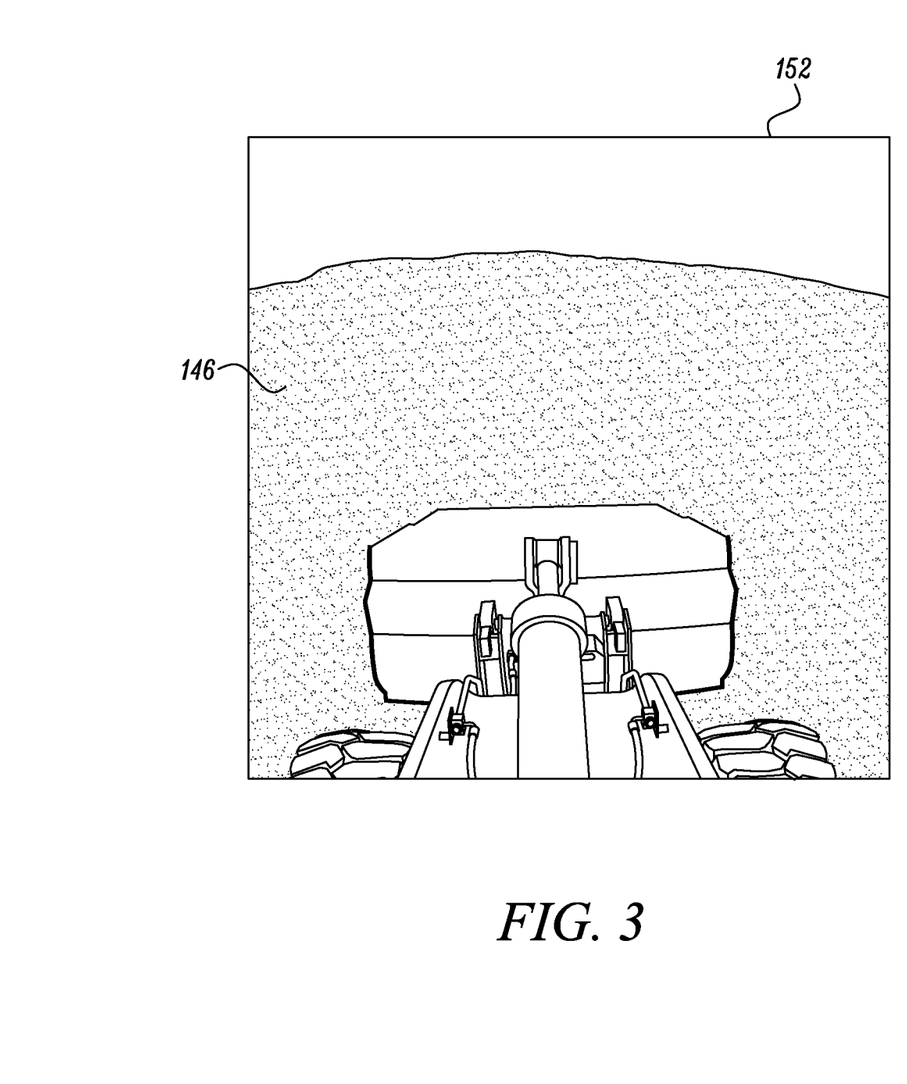
FIG. 3 is a view of the remote operator interface displaying a non-slippage condition of the work machine, in accordance with an embodiment of the present disclosure.

Referring to FIG. 2, a system 160 for communicating slippage experienced by the traction device 122 of the work machine 100 is described. The system 160 includes the one or more speed sensors 130, a controller 140, and the remote operator workstation 150. The controller 140 is communicably coupled to the speed sensor 130 and the remote operator workstation 150 to communicate with each of them. The communication may be wireless, and may include radio or other electromagnetic digital or analog transmission or conventional wired and/or wireless mechanisms. In some embodiments, the system 160 may also include the IMU sensor 142 communicably coupled to the controller 140. The controller 140 may be positioned within the work machine 100 and thus may be part of the work machine 100. In some alternate embodiments, the controller 140 may be positioned outside the work machine 100, such as, within the remote operator workstation 150.

The controller 140 may be configured to represent the slippage experienced by the traction device 122 of the work machine 100 on the remote operator interface 152 of the remote operator workstation 150 (discussed later) for controlling the work machine 100 through the remote operator interface 152. The controller 140 is configured to communicate with the speed sensor 130 of the work machine 100 to receive the data associated with the speed of operation of the traction device 122 of the work machine 100 at the worksite 102. In some embodiments, the controller 140 is also configured to communicate with the IMU sensor 142 of the work machine 100 to receive the data associated with the acceleration of the work machine 100 at the worksite 102.

The controller 140 is configured to determine a slippage condition of the traction device 122 based on the data associated with the speed of operation of the traction device 122 received from the speed sensor 130. For example, the data associated with the speed of operation of the traction device 122 may correspond to the angular speed of the wheels 124, 126. In an embodiment, the controller 140 may be configured to determine the slippage condition of the traction device 122 by detecting an increase in the speed of operation of the traction device 122 beyond a threshold operation value.

In yet another example, the controller 140 may be configured to determine the slippage condition of the traction device 122 when the speed of operation of the traction device 122 corresponds to a speed or acceleration of the work machine 100 that is greater (e.g., beyond a corresponding threshold) than the speed or acceleration of the work machine 100 gauged from the IMU sensor 142. To this end, the controller 140 may be configured to obtain a linear movement data (e.g., one or more of speed and acceleration) of the work machine 100 based on the data associated with the angular speed of the wheels 124, 126 and compare the linear movement data with the data obtained from the IMU sensor 142. For example, when the work machine 100's traction device 122 indicates a speed greater (e.g., beyond a corresponding threshold) than a speed indicated by the IMU sensor 142, the controller 140 may associate the slippage condition with corresponding the traction devices 122 from where the speed of operation was obtained.

In yet another example, the controller 140 may be configured to determine the slippage condition based on a difference in the relative speeds of the plurality of wheels 124, 126 exceeding a threshold difference value. For example, if a difference between the speed of operation of the front wheel 124 and the speed of operation of the rear wheel 126 is determined to be greater than the threshold difference value, the controller 140 may associate the slippage condition with the front wheel 124. Although not discussed, it would be appreciated that the slippage condition of the traction devices 122 of the work machine 100 may be determined based on various other techniques known in the art.

The controller 140 is configured to issue a notification of the slippage condition to the remote operator workstation 150, for example, through the remote operator interface 152 of the remote operator workstation 150. The notification may include activation of a visual overlay over a virtual image, of the traction device 122, displayed in the video feed to represent the slippage condition on the remote operator interface 152 of the remote operator workstation 150. In some embodiments, activating the visual overlay further includes changing one or more attributes of the visual overlay to indicate a variation in the slippage condition. For example, the attributes include one or more of an opacity or a color of the visual overlay on the virtual image, of the traction device 122, displayed on the remote operator interface 152.

In an example, the controller 140 may be configured to reduce the opacity of the visual overlay on the virtual image, of the traction device 122 in response to a reduction in the slippage of the corresponding traction device 122. In the same manner, the controller 140 may be configured to increase the opacity of the visual overlay on the virtual image, of the traction device 122 in response to an increase in the slippage of the corresponding traction device 122. In another example, the controller 140 may configured to change the color of the visual overlay on the virtual image, of the traction device 122 to a first color in case of a non-slippage condition i.e., when there is no slippage experienced by the corresponding traction device 122. In the same manner, the controller 140 may configured to change the color of the visual overlay on the virtual image, of the traction device 122 to a second color when there is a slippage condition experienced by the corresponding traction device 122. In some embodiments, the controller 140 may configured to reduce an intensity of the color of the visual overlay on the virtual image, of the traction device 122 in response to response to a reduction in the slippage of the corresponding traction device 122 and increase the intensity of the color in response to an increase in the slippage of the corresponding traction device 122.

In an embodiment, activating the visual overlay includes animating the visual overlay such that the visual overlay spins commensurately to a spinning action experienced by the virtual image of the traction device 122 displayed in the video feed. For example, the spinning action may correspond to the data associated with the speed of the corresponding traction device 122. To this end, the controller 140 is configured to determine the data associated with the speed of the traction device 122 and animate the visual overlay such that the visual overlay spins commensurately to the speed of the traction device 122 in the video feed, thereby providing an indication of the slippage experienced by the traction device 122. In accordance with various embodiments of the present disclosure, the controller 140 is further configured to deactivate the notification after a lapse of a predefined period from an issuance of the notification.

In accordance with various embodiments of the present disclosure, the slippage condition may correspond to a first slippage condition and the one or more attributes may include a first attribute when the speed of the traction device 122 is less than or equal to a slippage threshold value. Alternatively, the slippage condition may correspond to a second slippage condition and the one or more attributes may include a second attribute when the speed of the traction device 122 is greater than the slippage threshold value. The first attribute may be different from the second attribute. As an example, the first attribute may include 'yellow' color and the second attribute may include 'red' color, with exemplary 'red' indicating a heightened or severe slippage condition.

The remote operator workstation 150 is configured to receive the notification of the slippage condition of the traction device 122 from the controller 140 and display the notification on the remote operator interface 152. As described in detail above, the notification may correspond to the activation of the visual overlay over the virtual image of the traction device 122 displayed in the video feed to represent the slippage condition on the remote operator interface 152 and the change in one or more attributes of the visual overlay may indicate a variation in the slippage condition.

Figure 4:
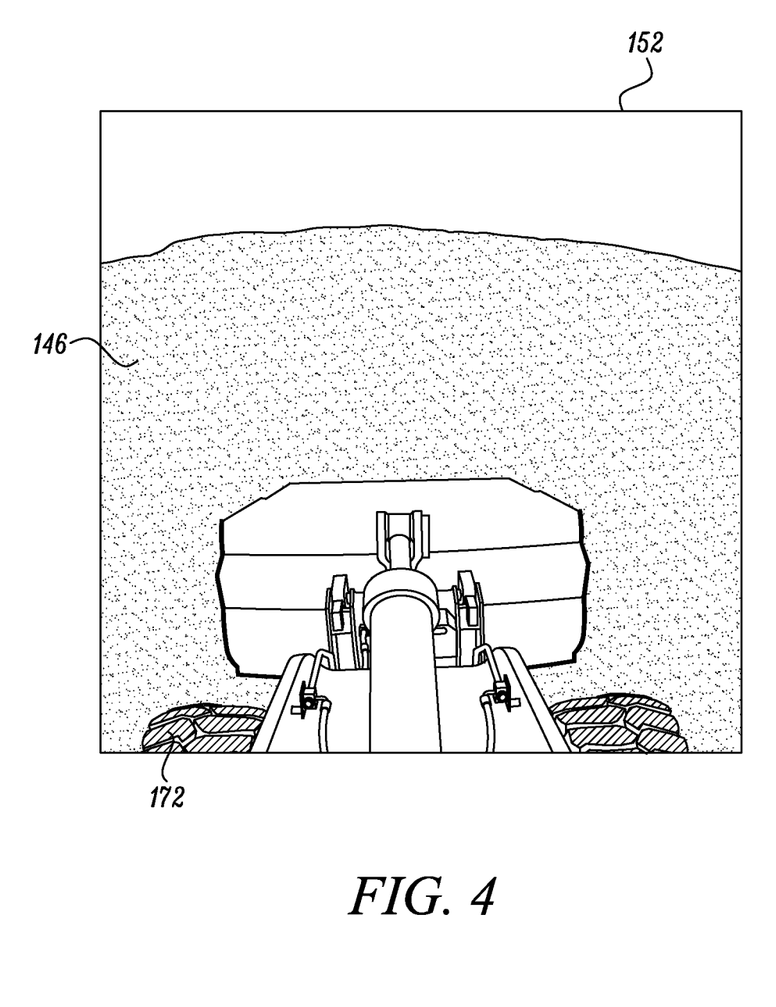
FIGS. 4 and 5 are various views of the remote operator interface displaying the slippage condition of the work machine, in accordance with an embodiment of the present disclosure.
Figure 5:
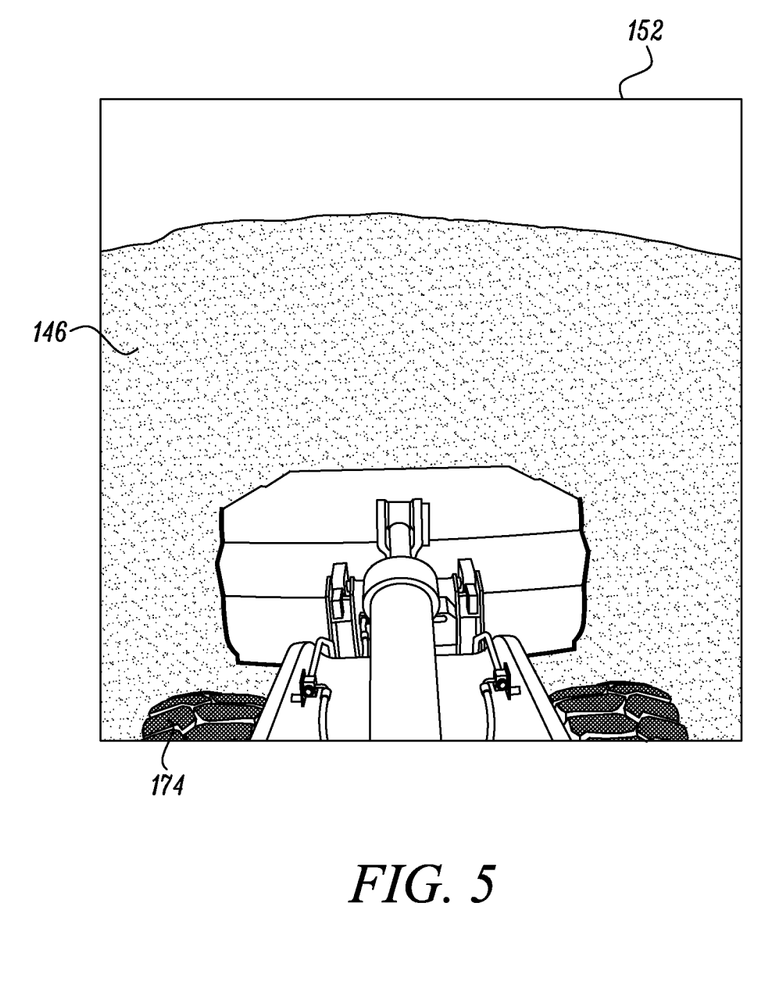

FIGS. 4 through 5 are various views displayed on the remote operator interface 152 of the remote operator workstation 150. As shown in FIGS. 4 and 5, when the traction device 122 is experiencing the slippage condition, the visual overlay 172, 174 is displayed over the video feed 146 on the remote operator interface 152. Furthermore, a reduction in the slippage of the traction device 122 is represented by the visual overlay 172 having reduced opacity on the video feed 146, as shown in FIG. 4. Similarly, as shown in FIG. 5, an increase in the slippage of the traction device 122 is represented by the visual overlay 174 having increased opacity on the video feed 146.

Similarly, when the attribute corresponds to the color of the visual overlay on the virtual image of the traction device 122, the first color may be utilized to represent the non-slippage of the traction device 122 and the second color may be utilized to represent the slippage of the traction device 122. In some embodiments, the reduced intensity of the color may represent a reduction in the slippage of the traction device 122 and the increased intensity of the color may represent an increase in the slippage of the traction device 122. In some embodiments, the visual overlay on the virtual image of the traction device 122 is animated such that the visual overlay spins commensurately to the spinning action experienced by the virtual image of the traction device 122 displayed in the video feed to represent the slippage condition experienced by the traction device 122.

INDUSTRIAL APPLICABILITY

During operation, when the work machine 100 interacts with (e.g., cultivate, dig, rip, or otherwise disturb) the material bank 104, the reactionary resistance applied by the material bank 104 on the implement 120 of the work machine 100 may impede the work machine's ingress into the material bank 104, and may cause the one or more traction devices 122 of the work machine 100 to slip over the ground surface 106. In some cases, one or more traction devices 122 of the work machine 100 may sustain more slippage than one or more of the other traction devices 122, e.g., when there is a lack of sufficient friction between those traction devices 122 and the ground surface 106.

An operator stationed and operating the work machine 100 remotely via the remote operator workstation 150 may not perceive and feel the slippage experienced by the work machine 100. The system 160 communicates such slippage to the remote operator interface 152. In accordance with various embodiments of the present disclosure, the level of slippage experienced by the work machine 100 may be determined based on the data obtained from the speed sensor 130 and notified to the remote operator workstation 150 to take corrective actions.

Figure 6:
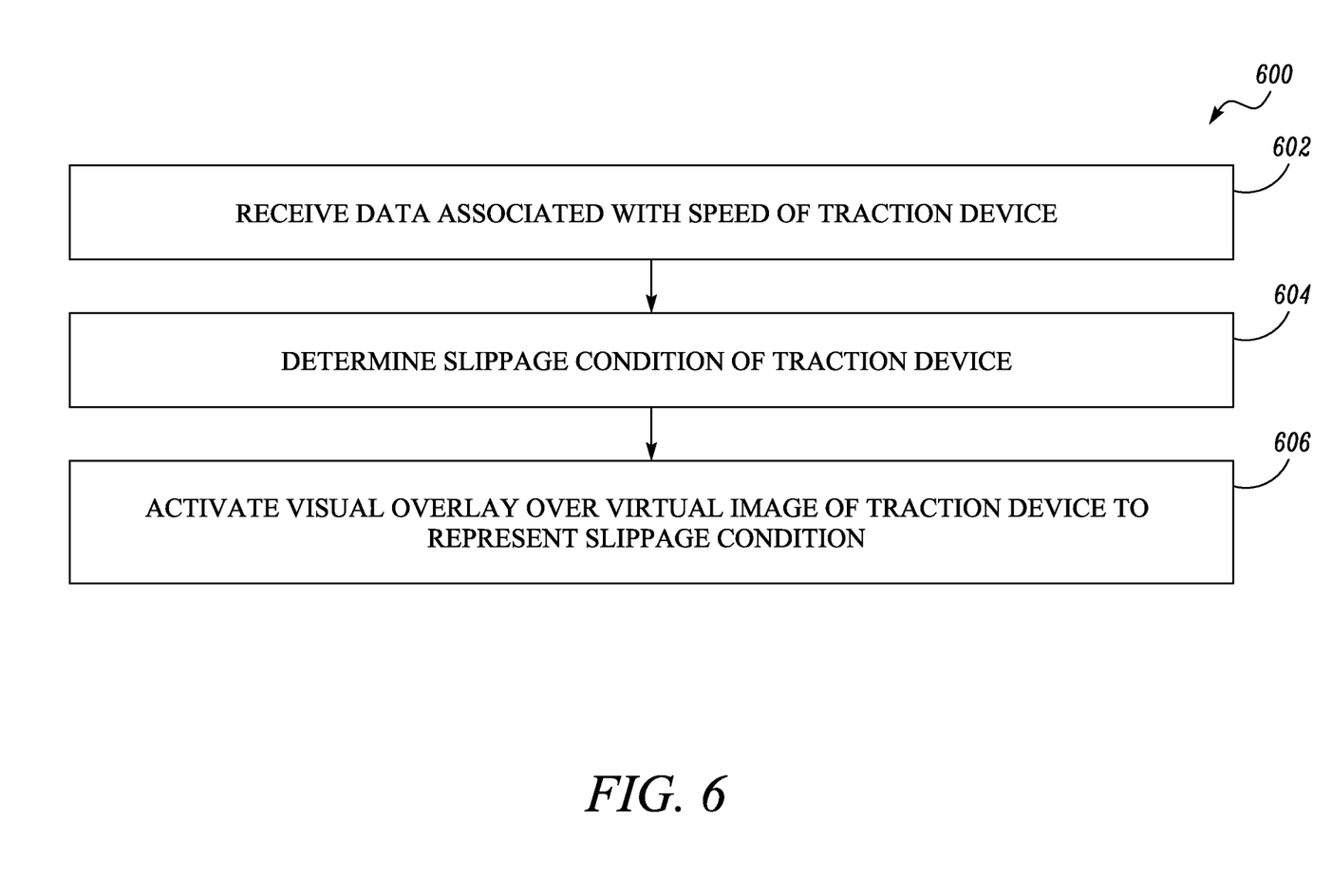
FIG. 6 is a flowchart illustrating steps of a method for communicating the slippage condition of the work machine to the remote operator interface, in accordance with an embodiment of the present disclosure.

FIG. 6 shows a method 600 for communicating slippage experienced by at least one traction device 122 of the work machine 100, to a remote operator interface 152. At step 602, the controller 140 receives the data associated with the speed of the traction device 122 of the work machine 100. At step 604, the controller 140 determines the slippage condition of the traction device 122 based on the data. The controller 140 further activates the visual overlay 172, 174 over the virtual image, of the traction device 122, displayed in the video feed 146 to represent the slippage condition on the remote operator interface 152, at step 606.

In some embodiments, the controller 140 is configured to change the one or more attributes of the visual overlay 172, 174 to indicate the variation in the slippage condition. For example, when the one or more attributes include the opacity of the visual overlay 172, 174 on the virtual image, of the traction device 122, displayed on the remote operator interface 152, the controller 140 is configured to reduce the opacity in response to the reduction in the slippage of the traction device 122 and increase the opacity in response to the increase in the slippage of the traction device 122. In yet another example, when the one or more attributes include the color of the visual overlay on the virtual image, of the traction device 122, displayed on the remote operator interface 152, the controller 140 is configured to reduce the intensity of the color in response to the reduction in the slippage of the traction device 122 and increase the intensity of the color in response to the increase in the slippage of the traction device 122.

The present disclosure provides a method and system to notify the remote operator of the work machine 100 of the slippage condition experienced by the traction devices 122 of the work machine 100 on the worksite 102. The notifications enable the remote operator to effectively operate the work machine 100 and avoid any potential wear or damage to the traction devices 122 of the work machine 100 by providing feedback and perception of the level of slippage experienced by the work machine 100 at the worksite 102. This increases the life of the traction devices 122 of the work machine 100 and reduces the need for the repair or replacement of one or more of the traction devices 122, saving time, effort, and cost.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for communicating slippage experienced by at least one traction device of a work machine, to a remote operator interface for controlling the work machine through the remote operator interface, the system comprising:
a controller configured to:
receive, from a camera that is facing towards a front of the work machine and captures a field of view from above the at least one traction device, a video feed that indicates an operation of the at least one traction device;
receive data associated with a speed of the at least one traction device;
determine information indicating a change of a slippage condition of the at least one traction device based on the data;
generate a visual overlay that includes one or more attributes that are based on the change of the slippage condition; and
provide the visual overlay to be displayed in combination with and over top of a virtual image, of a portion of the at least one traction device, displayed in the video feed to represent the change in the slippage condition on the remote operator interface, wherein the one or more attributes change an appearance of a tread of the portion of the at least one traction device based on the slippage condition, and
wherein the video feed is a real-time video feed, indicating one or more operations of the work machine, displayed on the remote operator interface.

2. The system of claim 1, wherein the one or more attributes include an opacity of the visual overlay.

3. The system of claim 2, wherein, to generate the visual overlay, the controller is configured to one of:
reduce the opacity based on the change of the slippage condition indicating a reduction in the slippage condition, or
increase the opacity based on the change of the slippage condition indicating an increase in the slippage condition.

4. The system of claim 1, wherein the one or more attributes include a color of the visual overlay.

5. The system of claim 4, wherein, to generate the visual overlay, the controller is configured to one of:
change the color based on the change of the slippage condition indicating a reduction in the slippage condition, or
change the color based on the change of the slippage condition indicating an increase in the slippage condition.

6. The system of claim 1, wherein, to provide the visual overlay, the controller is configured to animate the visual overlay such that the visual overlay indicates spinning of the at least one traction device corresponding to a spinning action of the at least one traction device indicated in the virtual image, and
wherein the spinning action corresponds to the speed of the at least one traction device.

7. The system of claim 1, wherein the slippage condition corresponds to a first slippage condition and the one or more attributes include a first attribute when the speed of the at least one traction device is less than or equal to a slippage threshold value.

8. The system of claim 7, wherein the slippage condition corresponds to a second slippage condition and the one or more attributes include a second attribute when the speed of the at least one traction device is greater than the slippage threshold value.

9. The system of claim 8, wherein the first attribute is different from the second attribute.

10. The system of claim 1, wherein, to determine the information indicating the change of the slippage condition, the controller is configured to determine the slippage condition by detecting an increase in the speed of operation beyond a threshold value.

11. The system of claim 1,
wherein the at least one traction device includes a plurality of wheels,
wherein the slippage condition is determined based on the data indicating a difference in relative speeds of the plurality of wheels exceeding a threshold value.

12. The system of claim 1, wherein the one or more attributes change the appearance of the tread by changing one or more of an opacity, a color, an action, or another attribute of the portion of the at least one traction device relative to how the portion of the at least one traction device appears in the virtual image without the visual overlay.

13. The system of claim 12, wherein the one or more attributes change the appearance of the tread by changing at least the color of the portion of the at least one traction device.

14. The system of claim 12, wherein the one or more attributes change the appearance of the tread by changing at least the opacity of the portion of the at least one traction device.

15. A method for communicating slippage experienced by a front wheel of a work machine, to a remote operator interface for controlling the work machine through the remote operator interface, the method comprising:
receiving, from a camera that is facing towards a front of the work machine and captures a field of view from above the front wheel, a video feed that indicates an operation of the front wheel;
receiving, by a controller, data associated with a speed of the front wheel;
determining, by the controller, information indicating a change of a slippage condition of the front wheel based on the data;
generating a visual overlay that includes one or more attributes that are based on the change of the slippage condition; and
providing, by the controller, the visual overlay to be displayed in combination with and over top of a virtual image, of a portion of the front wheel, displayed in the video feed to represent the change in the slippage condition.

16. The method of claim 15, wherein the one or more attributes include an opacity of the visual overlay on the virtual image.

17. The method of claim 15, wherein the one or more attributes include a color of the visual overlay.

18. The method of claim 15, wherein providing the visual overlay includes animating, by the controller, the visual overlay such that the visual overlay indicates spinning corresponding to a spinning action experienced by the front wheel in the video feed.

19. A work machine, comprising:
at least one traction device; and
a controller configured to cause the work machine to:
receive, from a camera that is facing towards a front of the work machine and captures a field of view from above the at least one traction device, a video feed that indicates an operation of the at least one traction device;
receive data associated with a speed of the at least one traction device;
determine information indicating a change of a slippage condition of the at least one traction device based on the data;
generate a visual overlay that includes one or more attributes that are based on the change of the slippage condition; and
provide, from the work machine and to a remote operator workstation that is positioned outside the work machine and configured to control the work machine, the visual overlay over a virtual image of a portion of the at least one traction device displayed in the video feed to indicate the change in the slippage condition on a remote operator interface of the remote operator workstation.

20. The work machine of claim 19, wherein, to provide the visual overlay, the controller is configured to:
activate the visual overlay based on detecting the slippage condition while the work machine digs a material bank.

* * * * *